United States Patent [19]

Meyer

[11] Patent Number: 4,955,631
[45] Date of Patent: Sep. 11, 1990

[54] FIFTH WHEEL COUPLING FOR ALLOWING AND CONTROLLING SIDE TO SIDE SWAY

[76] Inventor: Willard W. Meyer, 1380 Illinois St. SW., Huron, S. Dak. 57350

[21] Appl. No.: 339,397

[22] Filed: Apr. 17, 1989

[51] Int. Cl.⁵ ............................................. B62D 53/08
[52] U.S. Cl. .................................. 280/438.1; 280/439
[58] Field of Search ............................. 280/438.1, 439

[56] References Cited

U.S. PATENT DOCUMENTS

| | | | |
|---|---|---|---|
| 1,380,490 | 6/1921 | Masury | 280/439 |
| 2,857,174 | 10/1958 | Brown | 280/438.1 |
| 3,122,382 | 2/1964 | Carrier | 280/438.1 |
| 3,282,608 | 11/1966 | Braunberger | 280/438.1 |
| 3,309,111 | 3/1967 | Vaugoyeau | 280/438.1 |
| 3,897,086 | 7/1975 | Freford | 280/438.1 |
| 3,899,194 | 8/1975 | Breford | 280/438.1 |
| 4,017,095 | 4/1977 | Best | 280/438.1 |
| 4,045,050 | 8/1977 | Hawk | 280/438.1 |
| 4,199,168 | 4/1980 | Bush et al. | 280/439 |
| 4,444,408 | 4/1984 | Goth | 280/438.1 |

FOREIGN PATENT DOCUMENTS 1119992  6/1956  France ............................. 280/438.1

Primary Examiner—Charles A. Marmor
Assistant Examiner—Victor E. Johnson
Attorney, Agent, or Firm—Palmatier & Sjoquist

[57] ABSTRACT

The present fifth wheel sway hitch connects the frame of a mobile camper to the fore and aft tiltable fifth wheel mounting in the box of a pickup truck. The fifth wheel sway hitch permits a transverse or side to side swaying of the mobile camper relative to the pickup truck by the inclusion of a longitudinally disposed hinged connection and a pair of rigid stops to prevent excess swaying. With the fifth wheel sway coupling, a driver is less often confronted with counter-control forces being transmitted from the camper, through the coupling, and to the pickup truck. Hence, driver fatigue is reduced.

6 Claims, 3 Drawing Sheets

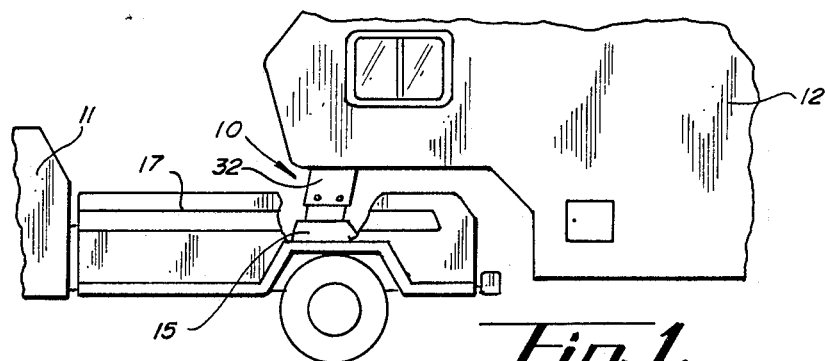
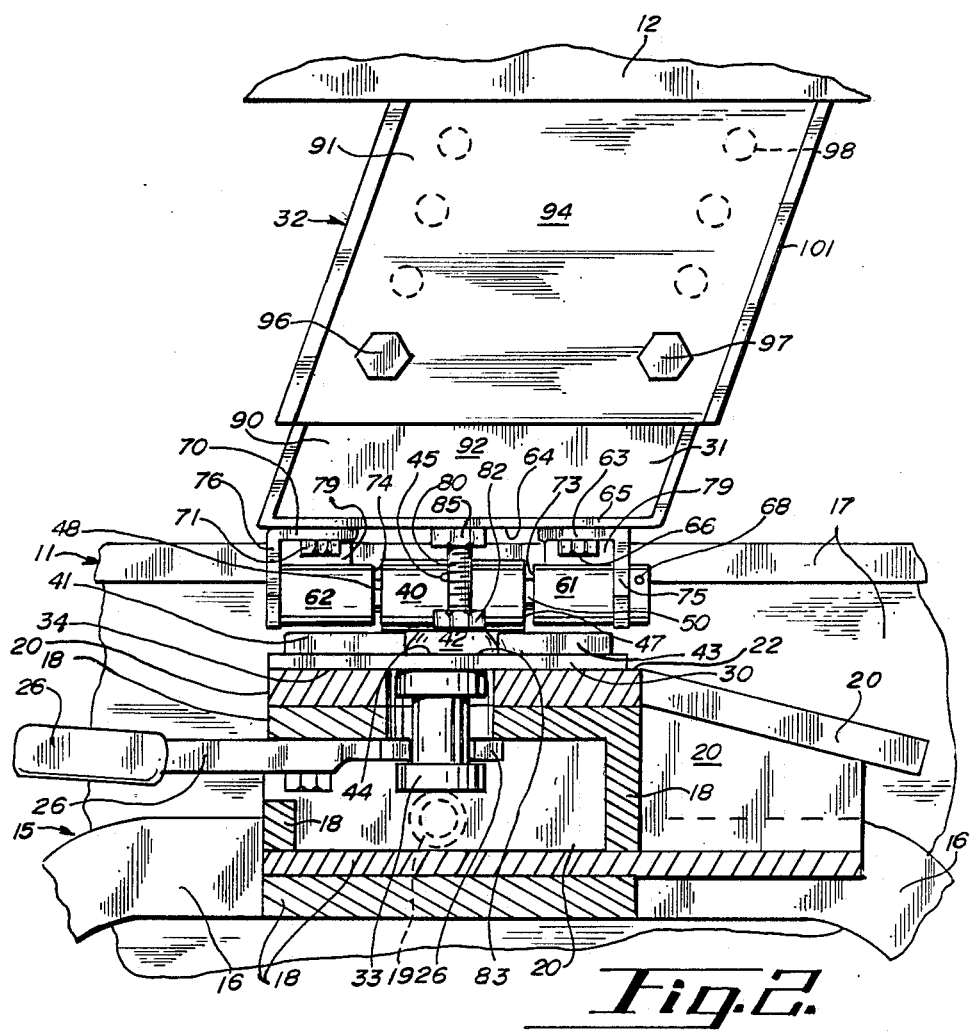

FIFTH WHEEL COUPLING FOR ALLOWING AND CONTROLLING SIDE TO SIDE SWAY

The present invention relates to fifth wheel couplings between mobile campers and automotive vehicles such as pickup trucks and, more particularly, to fifth wheel sway couplings allowing and controlling side to side swaying of such campers.

BACKGROUND OF THE INVENTION

A conventional wheel coupling includes a rigid upright standard extending downwardly from the front end of a mobile camper. The standard connects to a fifth wheel mounting frame affixed, for instance, to the bed of a pickup truck.

SUMMARY OF THE PRESENT INVENTION

A feature of the present invention is the provision in a fifth wheel hitch connecting the frame of a mobile camper to the tiltable fifth wheel mounting in the box of a pickup truck, of a hinged connection affixed to the upright standard of such a camper and oriented to tilt about a hinge axis extending longitudinally in the fore and aft direction of the truck and mobile camper.

Another feature of the present invention is the provision in a fifth wheel hitch connecting the frame of a mobile camper to the tiltable fifth wheel mounting in the box of a pickup truck, of a pair of adjustable rigid stops mounted adjacent the hinge connection to limit the tilting of the camper relative to the pickup truck.

Another feature of the present invention is the provision in a fifth wheel hitch connecting the frame of a mobile camper to the tiltable fifth wheel mounting in the box of a pickup truck, of a plurality of aligned shaft mountings being tiltable relative to each other and including a tilt shaft extending into said shaft mountings and retaining the mounting together to accommodate tilting of the trailer about the longitudinally extending axis.

An advantage of the present invention is a greater control of the towing vehicle such as a pickup truck. With a freedom of movement about a longitudinally disposed axis as is provided by the present invention and about a laterally disposed axis as is conventionally provided, the driver of the pickup truck need compensate less often for forces applied to the pickup truck by the mobile camper being towed. Hence, when the driver is confronted less often with such counter-control forces, driver fatigue is reduced.

Another advantage of the present invention is that the weight of a mobile camper is maintained in the middle of a pickup truck and distributed evenly to both of the rear wheels of the pickup truck. Furthermore, structural strain such as a twisting of the axles or front end is substantially eliminated with the present oscillating coupling which allows for a controlled swaying of the mobile camper relative to the pickup truck.

Another advantage of the present invention is that it provides for a greater control of the towing vehicle both on the highway and in close quarter maneuvering conditions. In close quarter maneuvering, the hinge connection accommodates highly irregular ground such as is found in campgrounds and state and national parks.

Another advantage of the present invention is that it accomplishes control by breaking the effective length of the camper and pickup truck and therefore allowing for relative independent movement.

Another advantage of the present invention is that it is inexpensive to manufacture, easy to install, and simple in operation.

BRIEF DESCRIPTION OF THE DRAWINGS

FIG. 1 shows an elevation view of the fifth wheel sway coupling connected between a pickup truck and a fifth wheel mobile camper.

FIG. 2 is a side detail elevation view of the fifth wheel sway coupling of FIG. 1.

DETAILED DESCRIPTION OF THE PREFERRED EMBODIMENT

Figure 3:
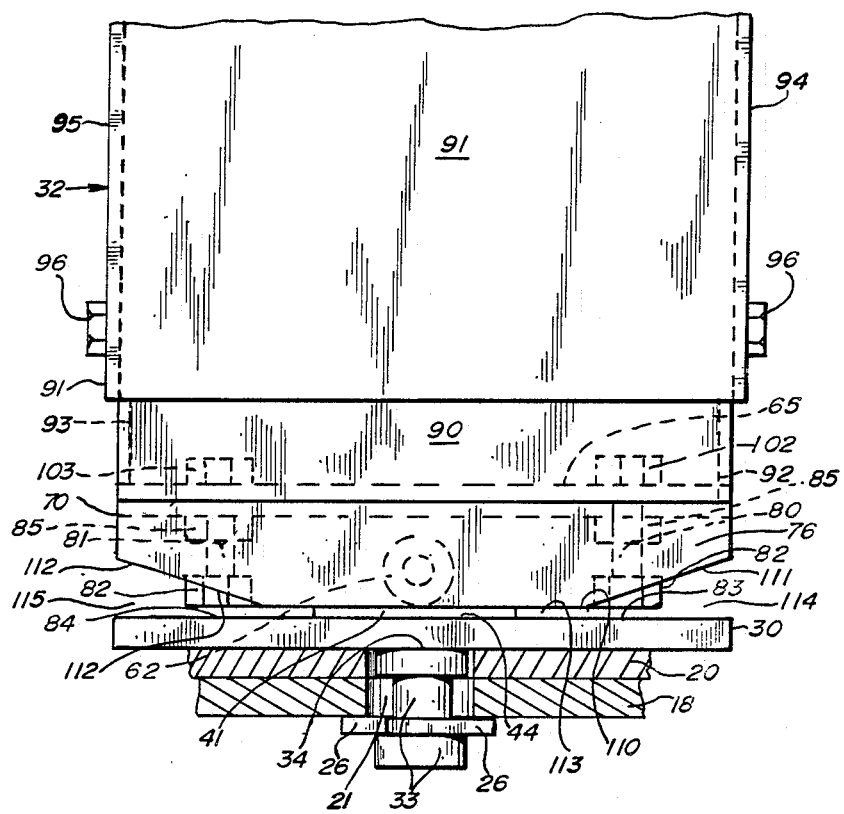
FIG. 3 is a front detail elevation view of the fifth wheel sway coupling shown in FIG. 1.

As shown in FIG. 1, reference numeral 10 designates in general the present fifth wheel sway coupling or hitch. The sway coupling 10 is hitched between a pickup truck 11 and a fifth wheel mobile camper 12.

A conventional fifth wheel coupling includes a fifth wheel mounting 15 having a pair of longitudinally disposed support legs 16 rigidly affixed to a box 17 of the pickup truck 11. A laterally disposed, fore and aft sway bar or beam 18 is tiltably connected between the legs 16 by a pin connection 19 to allow a fore and aft sway of the beam 18 relative to the legs 16 and box 17.

The fifth wheel mounting 15 further includes a generally U-shaped standard support plate 20 rigidly affixed to the transverse beam 18. The transverse beam 18 and support plate 20 form a pin connection receiving slot 21. The support plate 20 includes an upper standard bearing surface 22.

A conventional fifth wheel coupling further includes a rigid upright standard connectable to the frame of the mobile camper 12 and protruding downwardly therefrom toward the fifth wheel mounting 15. The conventional standard includes a connection pin connectable in the pin connection receiving slot 21 of the mounting 15 and U-shaped standard support plate 20. The connection pin is locked to the fifth wheel mounting 15 and plate 20 by utilizing a lever 26 to lock the mobile camper 12 to the pickup truck 11.

The tiltable connection 19 permits the trailer 12 to tilt relative to the truck 11 about a lateral axis defined by the lateral beam 18. Such a tilting is desirable when, for instance, the pickup truck 11 tows the trailer 12 over a curb.

Figure 4:
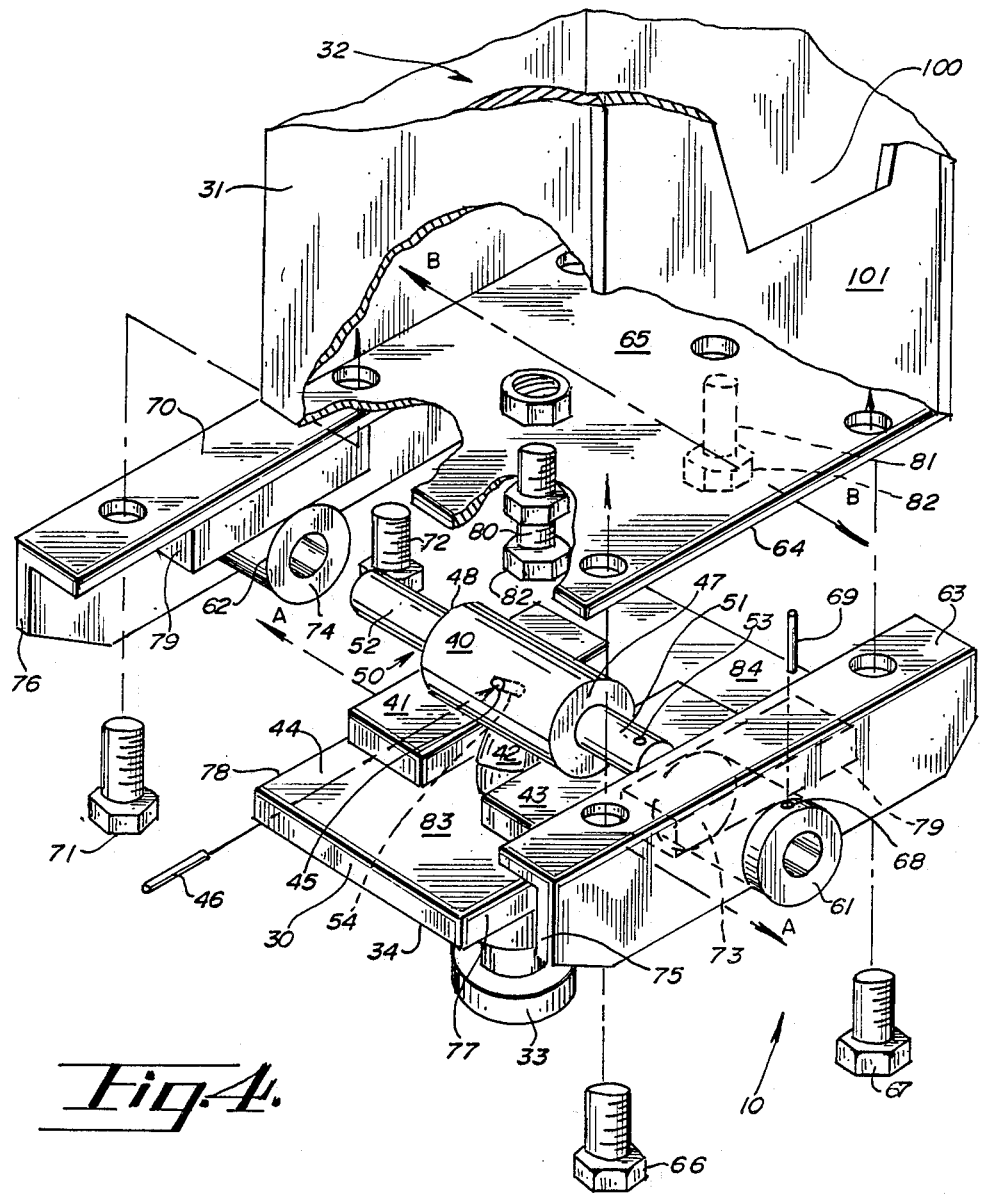
FIG. 4 is an exploded detail view of the fifth wheel swag coupling of FIG. 1.

As shown by FIGS. 2–4, the present fifth wheel sway coupling 10 includes a hinged fifth wheel tiltable supporting plate 30 underlying and in a spacial relation from a lower end 31 of an adjustable rigid upright standard 32. A connection pin 33 is centrally affixed in plate 30 and extends downwardly from a bottom face 34 of the supporting plate 30. The bottom face 34 bears upon the upper surface 22 of the U-shaped support plate 20.

A cylindrical, longitudinal hinge pin receiving mounting 40 is rigidly mounted on a set of three support plates 41, 42, 43. Plates 41 and 43 are rigidly mounted on an upper face 44 of the supporting plate 30. Plate 42 is an upper portion of connection pin 33 and is fixedly set in supporting plate 30.

The cylindrical mounting 40 includes a radial aperture 45 for receiving a locking grooved pin 46. The mounting 40 also includes a pair of bearing end portions 47, 48.

The cylindrical mounting 40 receives a longitudinally disposed hinge pin or tilt shaft 50. The shaft 50 includes a apertured shaft end 51 and an unapertured shaft end 52. The apertured end 51 includes a radially extending aperture 53. The tilt shaft 50 may also include a centrally disposed radial aperture 54 alignable with aperture 45 of the cylindrical mounting 40 for receiving the locking grooved pin 46. When inserted in apertures 54 and 45, the pin 46 prevents movement of the shaft 50 relative to the mounting 40.

Each of the shaft ends 51, 52 ride in one of two respective cylindrical bearings 61, 62. Bearing 61 is rigidly affixed to and extends partially through an apertured transverse angle iron 63 rigidly affixed to an underside 64 of an apertured bottom plate 65 of the lower end 31 of the standard 32 by a pair of connector pins 66, 67. Bearing 61 includes a radially extending aperture 68 for receiving a locking grooved pin 69. When inserted in apertures 53 and 68, the pin 69 prevents movement of the shaft 50 relative to the bearing 61. When the pins 46 and 69 are moved from the shaft 50, the shaft 50 is removable longitudinally from the coupling 10 through bearing 61.

Bearing 62 is rigidly affixed to an apertured, transverse angle iron 70 rigidly affixed to the underside 64 of the apertured bottom plate 65 in a spacial relation from the transverse angle iron 63 by a pair of connector pins 71, 72. If desired, bearing 62 may extend partially through the angle iron 70, and bearing 62 and shaft end 52 may be apertured for receiving a locking grooved pin.

Bearings 61, 62 include respective bearing surface portions 73, 74 which ride in close proximity to respective end portions 47, 48 of mounting 40 to limit longitudinal movement of the standard 32 with respect to the cylindrical mounting 40, support plate 30, and connection pin 33. Furthermore, bearings 61, 62 rotate freely above plates 43, 41, respectively. Still further, upright portions 75, 76 of the angle irons 63, 70 are typically disposed slightly inwardly of edges 77, 78 of the support plate 30. As shown in FIG. 2, bearings 61, 62 may be welded to blocks 79 which are in turn welded to angle irons 63, 70.

The bottom plate 65 of the standard 32 includes a pair of adjustable bolt-like stops 80, 81 adjustably mounted vertically therein and which are in a transverse spacial relation from one another. Each of the stops 80, 81 include a head 82 for bearing on one of two respective bearing surface portions 83, 84 of the upper face 44 of the supporting plate 30. Each of the stops 80, 81 further include a threaded nut 85 which is typically rigidly affixed to the bottom surface 64 of plate 65. Each of the stops 80, 81 is vertically adjustable in its respective nut 85.

As shown in FIG. 2-4, the standard 32 includes an apertured lower telescoping member 90 which slides in an apertured upper receiving member 91. Telescoping member 90 has apertured opposing side plates 92, 93 and receiving member 91 has apertured opposing side plates 94, 95. A set of connector pins 96, 97 are removably insertable through the paired, adjacent, cooperating, aligned plates 92, 94 and 93, 95 to adjust the length or height of the standard 32 relative to pickup truck 11. Lower member 90 may have a number of apertures 98.

As shown in FIG. 4, an opening 100 is formed in a rear portion 101 of members 90, 91. The opening 100 allows access into the standard 32 for connection of the connector pins 66, 67, 71, 72. The opening 100 may also allow access to the bolt-like stops 80, 81 and for the connection of respective threaded locking nuts 102, 103 to the stops 80, 81 to secure the stops 80, 81 at a particular height. It should be noted that locking nuts 102, 103 may be rigidly affixed to the upper surface of plate 65 and threaded nuts 85 may be tightened by a wrench against the lower surface 64 of plate 65 to secure the stops 80, 81 at a particular height.

It should be noted that each of the upright portions 75, 76 of the angle irons 63, 70 includes a straight edge 110 and a pair of oblique edges 111, 112. Furthermore, a space 113 exists between straight edge 110 and the upper surface 44 of the plate 30. The dimensions of space 113 may vary and is dependent upon the height of the upright portions 75, 76. A pair of spaces 114, 115 exists between respective oblique edges 111, 112. The dimensions of spaces 114, 115 may vary and depend upon the angles at which the oblique edges 111, 112 are disposed. The edges 111, 112 may bear against the upper surface 44 of the plate 30 if the stops 80, 81 are set at an incorrect height or break or become dislodged. In this sense, the edges 111, 112 may act as stops of a last resort.

In operation, to connect the mobile camper 12 to the pickup truck 11, the locking grooved pins 46, 69 are inserted in their respective apertures 45, and 68, 53 to lock the connection pin 33 relative to the standard 32 and to dispose the supporting plate 30 in substantially the same plane as the bottom plate 65 of the standard 32. The telescoping lower member 90 is then adjusted so as to provide the desired length to the standard 32. Subsequently, the pickup truck 11 is driven rearwardly so that the fifth wheel mounting 15 receives the connection pin 33. The locking lever 26 is then operated to lock the connection pin 33 and mobile camper 12 to the fifth wheel mounting 15 and pickup truck 11.

After the connection pin 3 has been locked to the fifth wheel mounting 15, the locking grooved pin connector 69 is removed from its respective apertures 53, 68. The fifth wheel sway coupling 10 is then ready for use.

In towing the mobile camper 12 over uneven ground such as is found in camping areas, or over the state highways or interstate systems or like roads, the camper 10 or pickup truck 11 may sway in a transverse or lateral motion relative to one another such as when one of the wheels of the mobile camper 12 rolls through a depression in the road or surface. When such a sway motion occurs, the standard 32 will move relative the support plate 30 and connection pin 33. For example, when a left rear wheel of the pickup 11 rolls through a depression, the supporting plate 30 tilts relative the bottom plate 65 of the standard 32 so that portion 83 of the plate 30 is disposed downwardly relative to portion 84. If the depression is sufficiently deep, the bearing portion 84 of the supporting plate 30 bears against the stop 81 and prevents any further tilting of the supporting plate 30 relative to the standard 32. After the rear left wheel of the pick up truck 11 rolls out of the depression and as the rear left wheels of the mobile camper 12 roll into the depression, the bottom plate 65 of the standard tilts transversely with respect to the supporting plate 30 with stop 82 tilting downwardly with respect to stop 81. If the depression is sufficiently deep, stop 80 bears against bearing surface portion 83 of the supporting plate 83 to prevent any further tilting of the standard 32 and mobile camper 12 relative to supporting plate 83, connection pin 33 and pickup truck 11.

It should be noted that the stops 80, 81 are adjustable so as to provide a range of angles of tilting. Each of the plates 30, 65 may tilt from zero to twenty degrees or more relative to its respective longitudinal axes A, B depending on the length of the adjustable stops 80, 81.

It should be further noted that the transverse beam 18 and connector pin 19, which define a lateral hinge axis to allow for fore and aft tilting, cooperates with the longitudinal hinge axis defined by the hinge pin 50, so that the trailer 12 may tilt, relative to the pickup truck 11, about a longitudinally disposed axis and a laterally disposed axis simultaneously.

What is claimed:

1. A fifth wheel hitch for connecting a frame of a pickup truck, comprising
    a rigid upright standard having an upper end connectable to the frame of such a camper and protruding downwardly therefrom toward the fifth wheel mounting on the truck,
    a fifth wheel supporting plate underlying a lower end of the upright standard and having a connection pin depending therefrom to be supported on and connected to the fifth wheel mounting on the truck,
    a hinged connection between and affixed to said supporting plate and to the upright standard and oriented to tilt about a hinge axis extending longitudinally of the truck and mobile camper, and
    a pair of rigid stops adjacent the hinged connection and between the supporting plate and upright standard to limit the tilting of the standard and trailer relative to the supporting plate, each of the rigid stops being vertically adjustable to vary the amount of tilting of the standard and trailer relative to the supporting plate.

2. A fifth wheel hitch according to claim 1 wherein the hinged connection includes a plurality of aligned bearings in spaced relation to each other, certain of said bearings being rotatable relative to each other and respectively affixed on the supporting plate and standard, and a tilt shaft extending into said bearings and retaining the bearings together to accommodate tilting of the trailer about the longitudinally extending axis.

3. The fifth wheel hitch according to claim 2 wherein the hinged connection includes a locking means connected to the tilt shaft for locking the support plate relative to the standard to preclude tilting of the support plate relative to the standard such as when the hitch is being coupled or uncoupled between the mobile camper and pickup truck.

4. The fifth wheel hitch according to claim 2, wherein the tilt shaft is removably affixed to the standard to allow removal of the supporting plate from the standard.

5. The fifth wheel hitch according to claim 1 wherein the standard includes a telescoping member so that the standard is adjustable in length.

6. A fifth wheel hitch for connecting the frame of a mobile camper to the tiltable fifth wheel mounting in the box of a pickup truck, comprising
    a rigid upright standard connectable to the frame of such a camper and protruding downwardly therefrom toward the fifth wheel mounting on the truck, the standard being adjustable in length and including a bottom plate,
    a fifth wheel supporting plate underlying the lower end of the upright standard and having a connection pin depending therefrom to be supported on and connected to the fifth wheel mounting on the truck, the connection pin being centrally affixed to the supporting plate, and
    a hinged connection between and affixed to the supporting plate and to the upright standard and oriented to tilt about a hinge axis extending longitudinally in the fore and aft direction of the truck and mobile camper, the hinge connection including a tilt shaft removably affixed to the supporting plate and having two ends, a pair of bearings removably affixed to the bottom plate of the standard and riding on the ends of the tilt shaft, a pair of stops adjustably connected to and extending downwardly from the bottom plate of the standard and transversely of each other and the tilt shaft and bearable against the supporting plates, and a locking means connected to the tilt shaft for preventing relative movement of the supporting plate and standard when the locking means is engaged whereby the hinged connection allows tilting of the supporting plate and standard relative each other, the stops preventing excessive tilting, and the locking means being engagable to prevent tilting such as when the connection pin is coupled to the fifth wheel mounting.

* * * * *

UNITED STATES PATENT AND TRADEMARK OFFICE
CERTIFICATE OF CORRECTION

PATENT NO. : 4,955,631

DATED : September 11, 1990

INVENTOR(S) : Willard W. Meyer

It is certified that error appears in the above-identified patent and that said Letters Patent is hereby corrected as shown below:

Column 4, line 38, delete "pin 3" and insert --pin 33--.

Signed and Sealed this

Eighth Day of September, 1992

*Attest:*

DOUGLAS B. COMER

*Attesting Officer*   *Acting Commissioner of Patents and Trademarks*